United States Patent [19]
Iida

[11] Patent Number: 5,251,234
[45] Date of Patent: Oct. 5, 1993

[54] DATA TRANSMISSION SYSTEM

[75] Inventor: Norihiko Iida, Tokyo, Japan

[73] Assignee: Nec Corporation, Japan

[21] Appl. No.: 397,665

[22] Filed: Aug. 23, 1989

[30] Foreign Application Priority Data

Aug. 24, 1988 [JP] Japan .................................. 63-211216
Jan. 4, 1989 [JP] Japan ...................................... 64-683

[51] Int. Cl.$^5$ .......................................... H04L 25/493
[52] U.S. Cl. ...................................... 375/20; 375/113; 307/270; 307/173
[58] Field of Search ................ 375/20, 36, 111, 113, 375/24, 110, 17, 18, 24, 113, 106; 370/110.1, 110.4, 473, 270; 341/68, 57; 332/115, 116; 329/305, 370; 395/106

[56] References Cited

U.S. PATENT DOCUMENTS

| | | | |
|---|---|---|---|
| 2,912,684 | 11/1959 | Steele | 375/110 X |
| 3,459,892 | 8/1969 | Shagena et al. | 375/110 X |
| 3,688,036 | 8/1972 | Bland | 375/110 X |
| 4,118,791 | 10/1978 | Swain | 375/17 X |
| 4,271,526 | 6/1981 | Flora | 375/17 |
| 4,620,310 | 10/1986 | Lvovsky et al. | 375/17 |
| 4,700,358 | 10/1987 | Duncanson et al. | 375/111 X |

Primary Examiner—Curtis Kuntz
Assistant Examiner—Tesfaldet Bocure
Attorney, Agent, or Firm—Laff, Whitesel, Conte & Saret

[57] ABSTRACT

A system transmits data between two semiconductor devices which are different from each other. The data modules either the amplitude or the amplitude and current of a synchronous transmit clock pulse train. The transmitted data is sent and received on one line.

6 Claims, 8 Drawing Sheets

DATA TRANSMISSION SYSTEM

BACKGROUND OF THE INVENTION

This invention relates to a transmission system, and particularly a system of transmitting data among plural semiconductor devices and a system of serially transmitting data on one line.

Conventionally, a three- or two-wire for serial data transmission system is usually used as a system for serial data transmission system. In the three-wire for serial data transmission system, two semiconductor devices, for example, one clock terminal and the other clock terminal of LSIs, a serial signal input and a serial signal output, and a serial signal output and a serial signal input are connected with each other, respectively, and one device supplies clock as a master, and the other device operates as a slave, wherein serial transmission is carried out with shifting data bit by bit according to number of pulses of clock. Further, when two devices mutually transfer data signal, it is necessary that data transmission is carried out, for example, by a system wherein two devices mutually output a busy signal for representing one's own status, and so four or five lines are used.

However, it is undesirable that some terminals of semiconductors such LSIs are occupied for serial data transmission, since other functions thereof are decreased. Further, in the case of bonding between chips in such a manner that the chips seemingly appear to be equal to one chip, in an application in which two semiconductors, for example LSIs are put in one package, it is preferable that the number of wire bondings between chips is as small as possible. When the number of wire bondings between chips are great, there is a problem on yield. Further, there is a problem that portions of bonding pads result in a primary factor by which on area of a chip is increased, thus cost being increased.

SUMMARY OF THE INVENTION

An object of the present invention is to provide a system of transmitting data among plural semiconductor devices, wherein receiving data sending and can be performed on one line and also terminals of semiconductor devices such as LSIs can be effectively used.

The above-mentioned object of the present invention is accomplished by a system of transmitting data between two semiconductor devices which are different from each other, comprising modulating the amplitude of synchronous transmission clock signal and sending and receiving the data signal on one line.

According to the present invention, serial data transmission can be carried out on one line so that terminals of LSIs can be effectively used.

Further, the above-mentioned object of the present invention is accomplished by a system of transmitting data between two semiconductor devices which are different from each other, comprising modulating amplitude and current of synchronous transmission clock signal and sending and receiving data signal on one line.

According to the present invention, serial data transmission can be carried out on one line so that terminals of LSIs can be effectively used and also a presettable shift register provided on a receiving area can be reset immediately from a sending area.

DETAILED DESCRIPTION OF PREFERRED EMBODIMENTS

The present invention is then explained concerning preferred embodiments with reference to the drawings.

Figure 1:
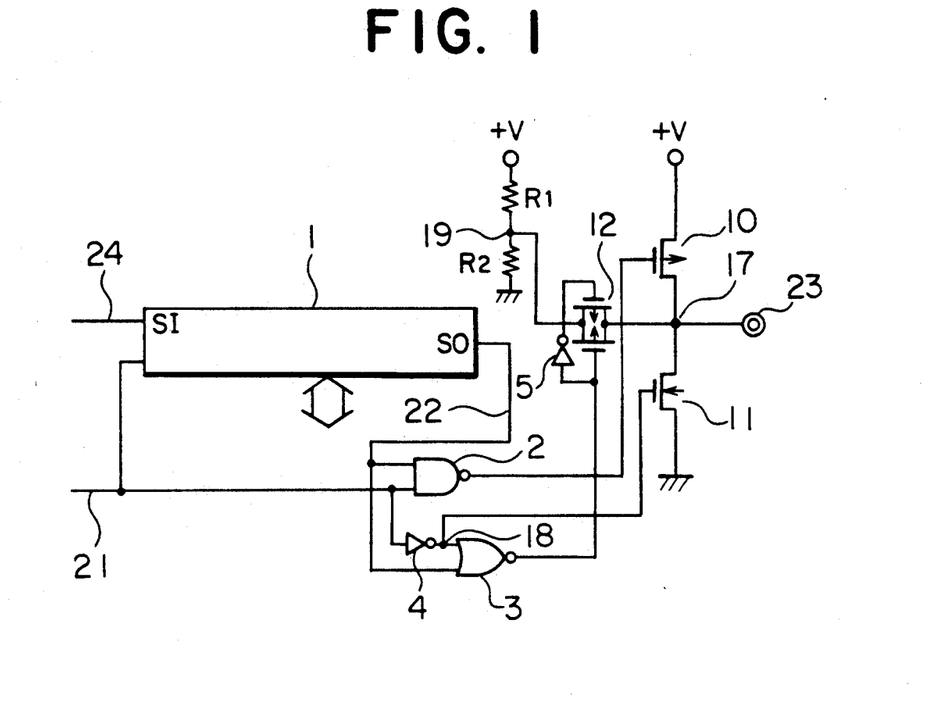
FIG. 1 is a block diagram of a sending area in a first example according to the present invention.
Figure 2:
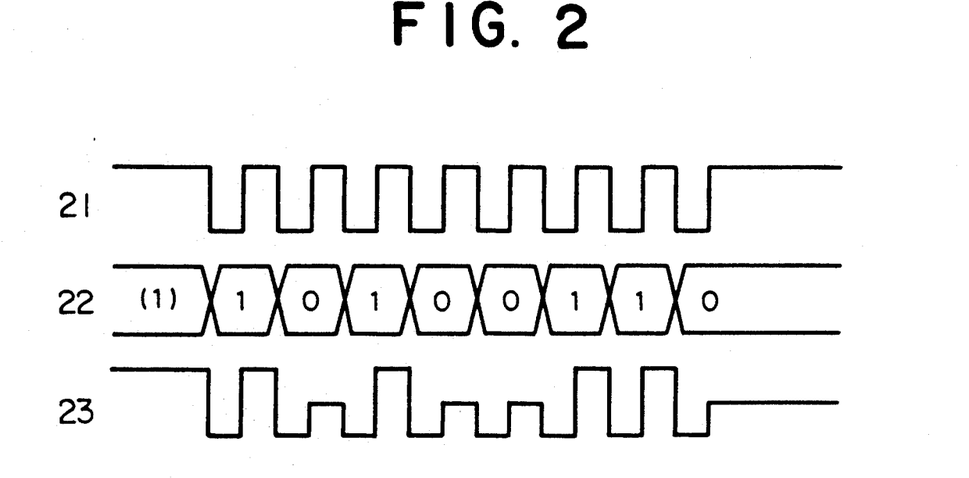
FIG. 2 is a timing chart illustrating operation of the sending area in the example shown in FIG. 1, FIG. 3 (A) is a block diagram of a receiving area in the first example shown in FIG. 1, FIG. 3 (B) is a timing chart illustrating operation of the receiving area shown in FIG. 3 (A)

FIG. 1 is a block diagram of a sending area in a first example of data transmission system by the amplitude modulation of synchronous transmission clock signals according to the present invention, and FIG. 2 is a timing chart illustrating operation thereof. In this timing chart, a change of synchronous transmission clock pulse 21, transmission data 22 and output pulse 23 against time are shown.

An equipment of sending area, as shown in FIG. 1, comprises a presettable shift register 1 of eight bits, a NAND circuit 2, a NOR circuit 3, inverters 4, 5, a P-channel MOS transistor 10, a N-channel MOS FET 11, a transfer gate 12 and resistors $R_1$ and $R_2$. The output of the presettable shift register 1 is connected to one input of the NAND circuit 2. A line for supplying clock pulses 21 is connected to the other input of NAND gate 2. The output of the inverter 4 which is connected to the line of the clock pulse source 21 is connected to one input of the NOR circuits 3, and the output of the presettable shift register 1 is connected to the other input of the NOR circuit 3. The source of the inverter 4 which is connected to the P-channel MOS transistor 10 is connected to a terminal 17, and the drain thereof is connected to power source +V. The drain of the N-channel MOS FET 11 is connected to the terminal 17, and the source thereof is connected to ground. The gate of the P-channel MOS transistor 10 is connected to the output of the NAND circuit 2, and the gate of the N-channel MOS FET 11 is connected to a terminal 18 which is connected to both the output of the inverter 4 and the input of the NAND circuit 2. The resistors $R_1$ and $R_2$ are connected to a terminal 19. The input of the resistor $R_1$ is connected to the power source $+V$, and the resistor $R_2$ is connected to ground. The input of the transfer gate 12 is connected to the terminal 19, and the output thereof is connected to an output terminal 23. One gate of the transfer gate 12 is connected to the output line of the NOR circuit 3, and the other gate thereof is connected to the output of the inverter 5 the input of which is connected to the output line of the NOR circuit 3.

The operation of the above-mentioned equipment of sending area is then explained.

Now, it is supposed that 10100110 is preset serially at the presettable shift register 1 and shifted left. The presettable shift register 1 is shifted by one bit with the fall of the clock pulse 21 so the initial numeral which is shifted out is "1". Therefore, when the clock pulse 21 is turned to "1", the output of the two-inputs NAND circuit is turned to "0", so the P-channel MOS transistor 10 being rendered conductive, and "1 level being outputted at the output terminal 23.

Then, in the case of data signal at 22 being "0", when the clock pulse 21 is turned to "1", the output of the two-inputs NOR circuit 3 is turned to "1", so the transfer gate 12 being rendered conductive, so that a voltage which is equal to $V.R_2/(R_1+R_2)$ is outputted at the output terminal 23. Further, when the clock pulse 21 is "0", the N-channel MOS FET 11 is rendered conductive so that the output terminal 23 is turned to "0" level without fail. Accordingly the signal of the waveform as shown at 23 in FIG. 2 is transmitted.

Figure 3A:
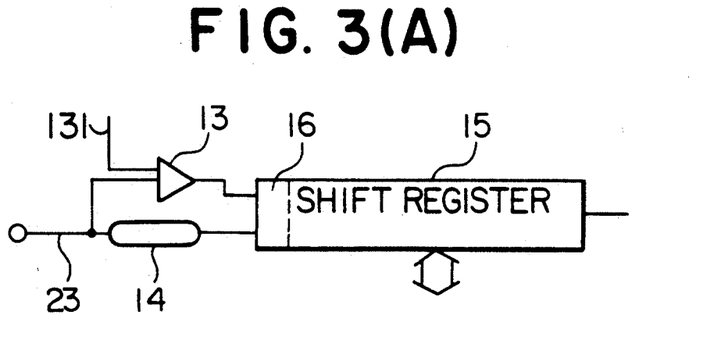
Figure 3B:
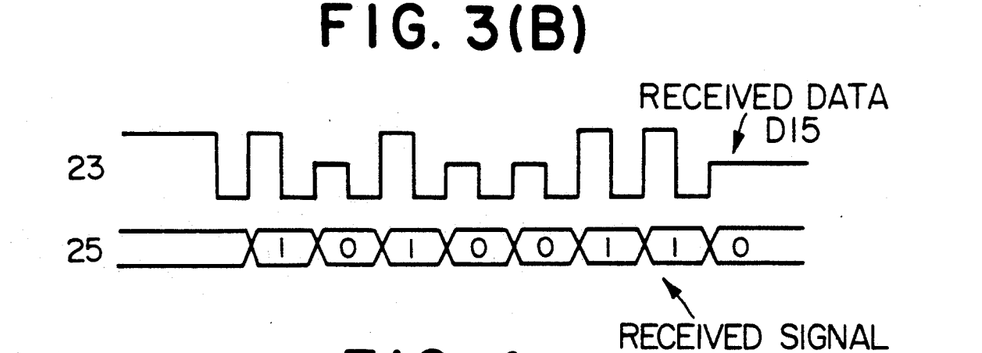

Then, referring to FIGS. 3 (A) and (B), an equipment of a receiving area is explained.

FIG. 3 (A) shows an input section of the equipment of the receiving area, and FIG. 3 (B) shows a timing chart of data $D_{15}$ fed to shift register 15 and signals $S_{24}$ of input signal line 24. An input signal line 24 is connected to an input terminal shown in FIG. 1, and a comparator 13, by receiving a reference voltage 131, discriminates the level of a signal $S_{24}$ to feed data $D_{15}$ to a shift register 15.

Referring to FIG. 3 (A), the input of a delay circuit 14 and the input of a comparator 13 are connected to an input signal line 24, and the output of the comparator 13 and the output of the delay circuit 14 are connected to the first stage 16 of the presettable shift register 15. Thus, the receiving circuit may comprise, for example, the comparator 13 for discriminating the level of the inputted signal 24, and the delay circuit 14 for delaying the clock pulse with a view to inputting the level thereof to the first stage 16 of the presettable shift register 15.

Figure 4:
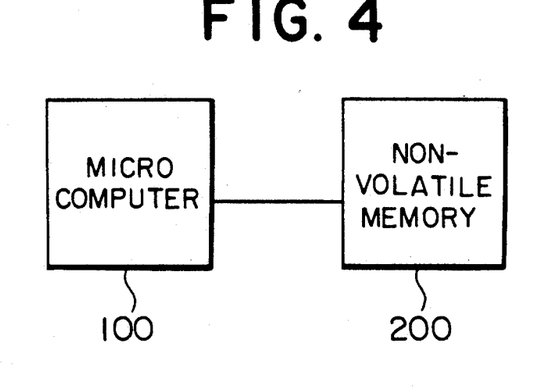
FIG. 4 is a connection diagram showing a connection between two semiconductor devices.

FIG. 4 is a conceptual diagram where two LSIs are coupled.

Referring to FIG. 4, a procedure of serially transferring data is explained.

As shown in FIG. 4, two LSIs 100 and 200 are coupled with each other. It is supposed that the LSI 100 is a microcomputer which operates as a master and the LSI 200 is a non-volatile memory which operates as a slave.

When value is written to the non-volatile memory 200 the microcomputer 100 sends to non-volatile memory 200 a memory address and a flag which represents which whether sending or receiving is to be carried out. Then if the transmitted flag is a sending flag 11, the non-volatile memory 200 operates so that data signal sent continuously from the microcomputer is written to the memory. When the sending or receiving flag sent is a receiving flag, the value of memory which is read out is carried on pulse sent from the microcomputer 100.

As the above-mentioned, it is possible to carry out the two-way data transmission on one line, by predetermining a procedure.

Figure 5:
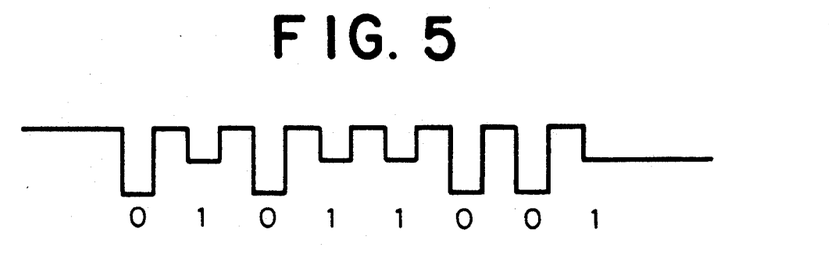
FIG. 5 is a timing chart in a second example according to the present invention.

FIG. 5 shows a timing chart of clock pulse and transmission data signal in another example of a transmission system by amplitude modulation according to the present invention.

In this example, the transmission data is the same as the data shown in FIG. 2, and FIG. 3 (B), but the output level is inverted.

In the above-mentioned example according to the present invention, the level is regulated by a resistance type potential divider with a view to modulating amplitude. However it can be also regulated by utilizing the forward voltage of a diode. Further, in the receiving area, a logical threshhold level can be used in place of a comparator.

Then, an example of a data transmission system by modulations of amplitude and current according to the present invention is explained with reference to the drawings.

Figure 6:
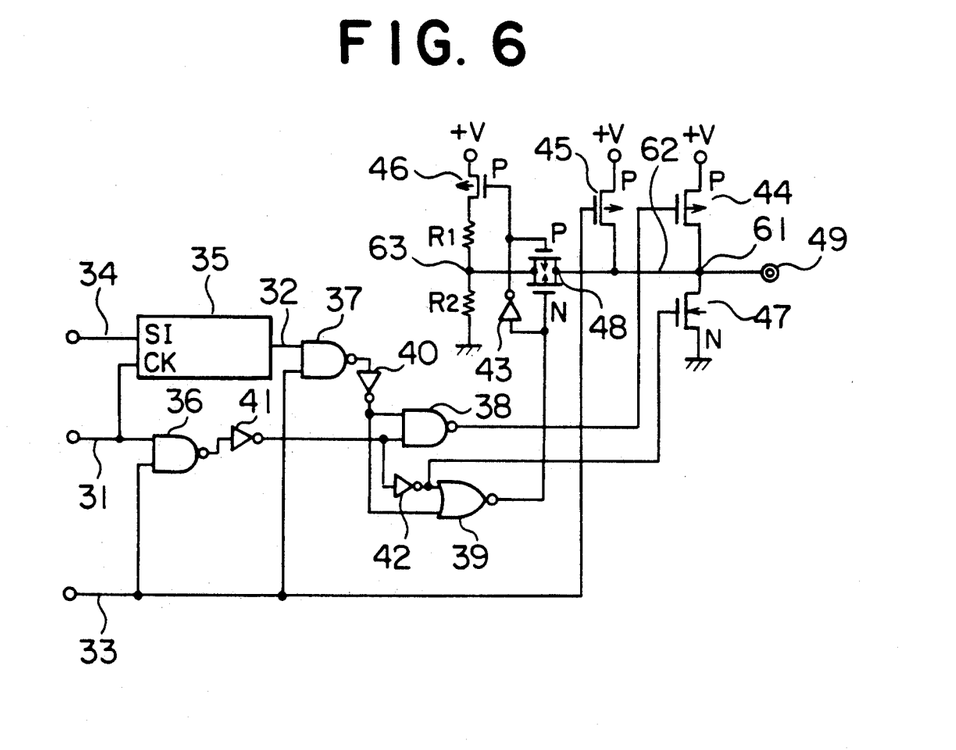
FIG. 6 is a block diagram of a sending area in a third example according to the present invention.
Figure 7:
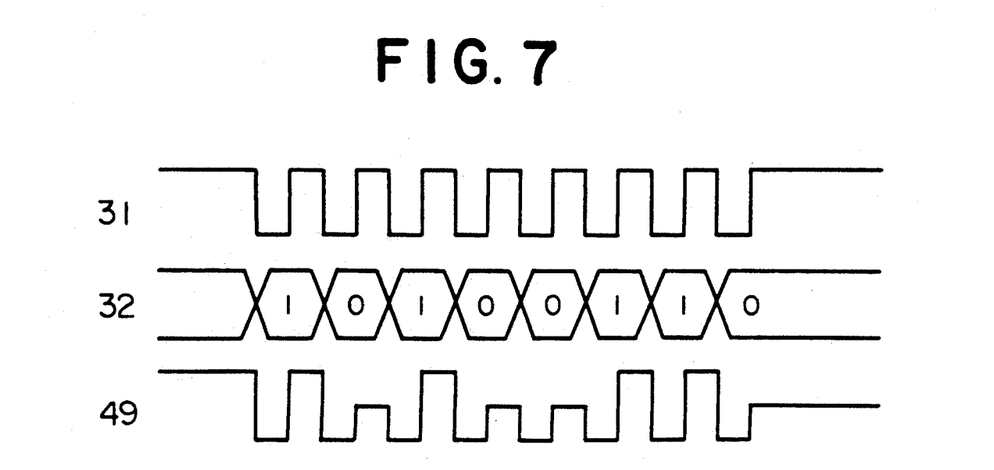
FIG. 7 is a timing chart illustrating the operation of the sending area in the third example, FIG. 8 (A) is a block diagram of a receiving area in the third example, FIG. 8 (B) is a timing chart illustrating operation of the receiving area shown in FIG. 8 (A).

FIG. 6 shows an equipment of a receiving area according to this example, FIG. 7 shows a timing chart of a clock pulse 31, a sending data signal 32 and clock pulse 50 the amplitude of which is modulated by the sending data signal.

As shown in FIG. 6, an equipment of sending area according to the present invention comprises a presettable shift register 35 of eight bits, first, second, and third NAND circuits 36, 37 and 38, a NOR circuit 39, first, second, third and fourth inverters 40, 41, 42 and 43, first, second and third P-channel MOS FETs 44, 45 and 46, a N-channel MOS TFT 47, a transfer gate 48 and resistors $R_1$ and $R_2$. A line of clock pulse 31 is applied to one input of the first NAND circuit 36, and the other input of the first NAND circuit 36 is connected to a line of signal 33. The output of the presettable shift register 35 is connected to one input of the second NAND circuit 37 and the other input of the second NAND circuit 37 is connected to the line of signal 33. One input of the third NAND circuit 38 is connected to the output line of the first inverter 40 and the other input of third NAND circuit 38 is connected to the output line of the second inverter 41. The input of the first inverter 40 is connected to the output of the second NAND circuit 37, and the input of the second inverter 41 is connected to the output of the first NAND circuit 36. One input of the NOR circuit 39 is connected to the output line of the third inverter 42, and the other input of the NOR circuit 39 is connected to the output line of the second inverter 40. The source of the first P-channel MOS TFT 47 is connected to the drain of the N-channel MOS TFT 47 through a terminal 61. The drain of the first P-channel MOS FET 44 is connected to power source $+V$, and the source of the N-channel MOS FET 47 is connected to ground. Further, a line 62 is provided through which the terminal 61 is connected to the output of the transfer gate 48. The source of the second N-channel MOS FET 45 is connected to said connection line 62. The drain of the second P-channel MOS FET 45 is connected to power source $+V$, the line of signal 33 is connected to the gate of the second P-channel MOS FET 45. The output of the third NAND circuit 38 is connected to the gate of the first P-channel MOS FET 44, and the output of the third inverter 42 is connected to the gate of the N-channel MOS FET 47.

Two resistors $R_1$ and $R_2$ are connected to a terminal 63, respectively. The input of the resistor $R_1$ is connected to the source of the third P-channel MOS FET 46, and the resistor $R_2$ is connected to ground. The drain of the third P-channel MOS FET 46 is connected to power source +V, and the gate of the third P-channel type MOS FET 46 is connected to the output line of the fourth inverter 43. The terminal 63 to which resistors $R_1$ and $R_2$ are connected is connected to the input of the transfer gate 48. One gate of the transfer gate 48 is connected to the output of the NOR circuit 39, and the other gate of the transfer gate 48 is connected to the output line of the four inverter 43. Further the input of the fourth inverter 43 is connected to the output line of the NOR circuit 39.

Operation of the equipment of sending area shown in FIG. 6 is then explained.

Now, it is supposed that 10100110← is preset serially at the presettable shift register 35 of 8 bits and shifted in the direction of an arrow. The presettable shift register 35 is shifted by one bit with the fall of the clock pulse 31, so the initial numeral which is shifted out is "1". Therefore, when the clock pulse 31 is turned to "1", the output of the two-inputs NAND 36 is turned to "0", so the first P-channel MOS transistor 44 being rendered conductive and "1" level being outputted at the output terminal 49. Then when the output of the shift register 35 is "0", the output of the two-inputs NOR circuit 39 is turned to "1", so the transfer gate 48 is rendered conductive so that a voltage which is equal to $V \cdot R_2/(R_1+R_2)$ is outputted at the output terminal 49.

Then when the clock pulse 31 is "0", the N-channel MOSFET 11 is rendered conductive so that the output terminal 49 is turned to "0" level without fail. Accordingly the signal 49 of waveform as shown in FIG. 7 is transmitted.

Signal 33 is used as reset signal of active low.

When the signal 33 is turned to "0", the transfer gate 48 is rendered non-conductive, the N-channel MOS TFT 47 is rendered non-conductive, the first and second P-channel MOS FETs 10 and 14 become an on-state. That is high level of the output 49 has two states of one state that only the first P-channel MOSFET 10 becomes an on-state and the other state that both the first and second P-channel type MOSFET 10 and 14 become an on-state. Therefore, by detecting this state at the slave, the resettable shift register can be asynchronously reset from the master.

Figure 8A:
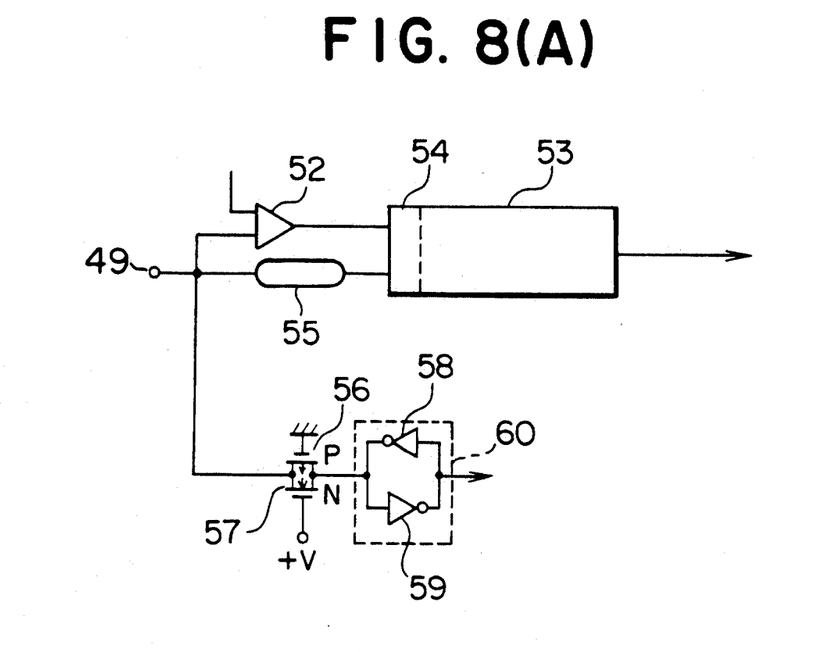
Figure 8B:
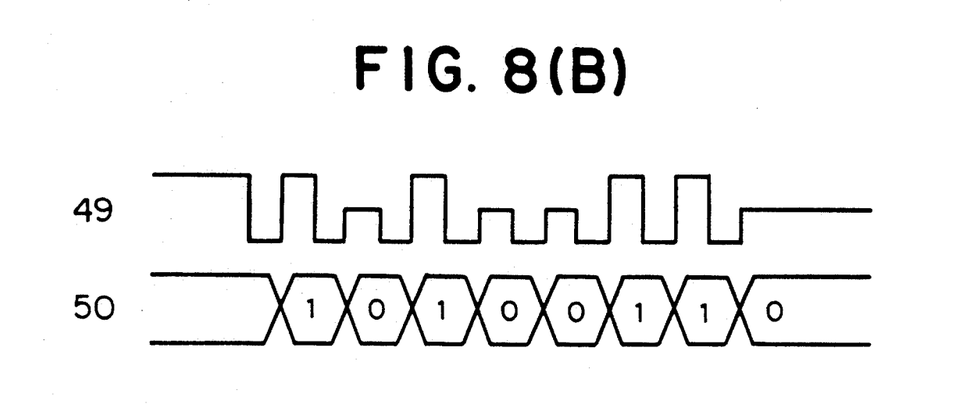

Then, referring to FIGS. 8 (A) and (B), an example of an equipment of receiving area is explained.

FIG. 8 (A) shows an input section of the equipment of the receiving area. The input section comprise a delay circuit 55, a comparator 52, and a presettable shift register 53 provided with a first stage 54. As shown in this figure, the equipment of receiving area may comprise a comparator 52 for discriminating the level of signal which is inputted and a delay circuit 55 for delaying the clock pulse with a view to inputting the level of the signal 49 to the first stage 54 of the presettable shift register 53. Further, the equipment shown in FIG. 8 (A) has a latch circuit 60 with the above-mentioned receiving circuit.

A procedure of bidirectional sending and receiving of data signal between two LSIs which have the circuit shown in FIG. 6 and the circuit shown in FIG. 8 (A) is then explained.

It is supposed that one LSI is a muster, and the other LSI is a slave and that the master has a microcomputer and the slave is a non-volatile memory. In the case of writing value to the memory, memory address and a flag which represents which of sending (or receiving) is to be carried are sent from the muster to the slave. When the sending (or receiving) flag which is sent is a sending flag, the slave operates so that data signal sent continuously from A is written to the memory. When the transmitting sending (or receiving) flag is a receiving flag, the value of the memory which is read out is carried on clock pulse sent from A. Further, when reset is applied from the muster, the latch 60 becomes high level so that reset can be applied. The set of the latch 60 is performed as follows. Since the P-channel MOS transistors 45 and 47 is rendered on-state, and the P-channel MOS transistor 56 is rendered conductive, the latch circuit 60 can be inverted by setting a total of equivalent resistances of the P-channel MOS transistors 45 and 47 to a value below about $\frac{1}{3}$ of the N-channel MOS transistor of an inverter 58. Release of reset can be performed as follows. That is, the latch circuit 60 can be inverted by setting a total of equivalent resistance of the N-channel MOS transistor 47 and equivalent resistance of a N-channel MOS transistor 57 to a value of $\frac{1}{3}$ of the P-channel MOS transistor 56 of the inverter 58. Thus it is useful that reset is immediately applied from the master to the slave, since it is not necessary to know the condition of the slave.

As the above-mentioned, it is possible to carry out the two-way data transmission on one line, by predetermining a procedure.

In the above example, the level is regulated by a resistance type potential divider. However a forwarded voltage of diode can be utilized in place of this. Further in the receiving area a logical threshold level can be used in place of a comparator.

Further another examples of a master station and a slave station according to the present invention are explained.

Figure 9:
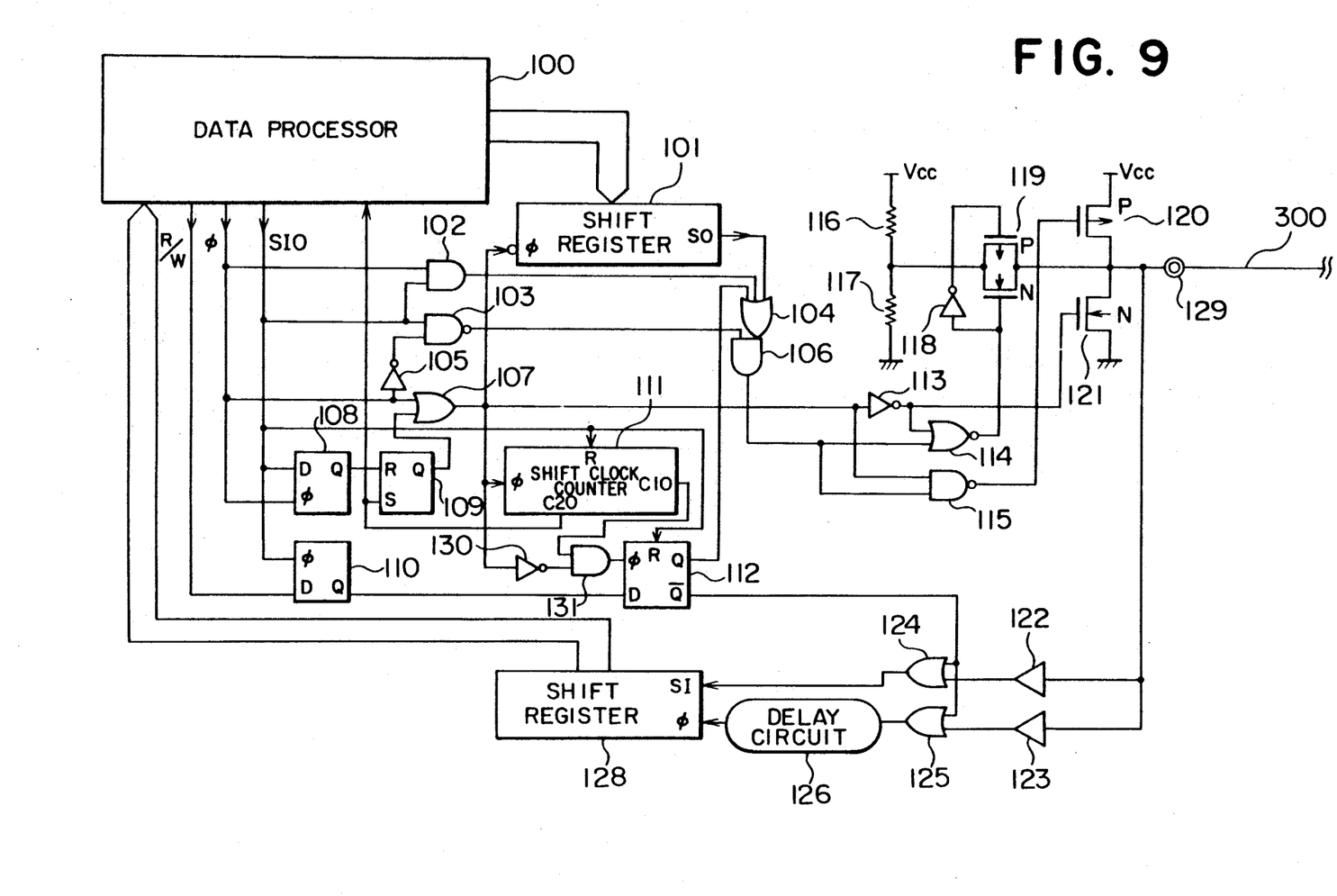
FIG. 9 is a block diagram of a master station in a fourth example.

Referring to FIG. 9, a master station comprise a data processor 100, first and second shift registers 101 and 128, a clock counter 111, first, second and third AND gates 102, 106 and 131, first and second NAND gates 103 and 115, first, second, third and fourth OR gates 104, 107, 124 and 125, a NOR gate 114, first, second, third and fourth inverters 105, 113, 118 and 130, first, second and third D type flip-flops 108, 110 and 112, a SR type flip-flops 109, first and second resistors 116 and 117, a transfer gate 119, a P-channel MOS transistor 120, a N-channel MOS transistor 121, first and second threshold circuit 122 and 123, a delay circuit 126 and a transmission terminal 129. The transmission terminal 129 is connected to a slave station shown in FIG. 10 through a transmission line 300.

Figure 10:
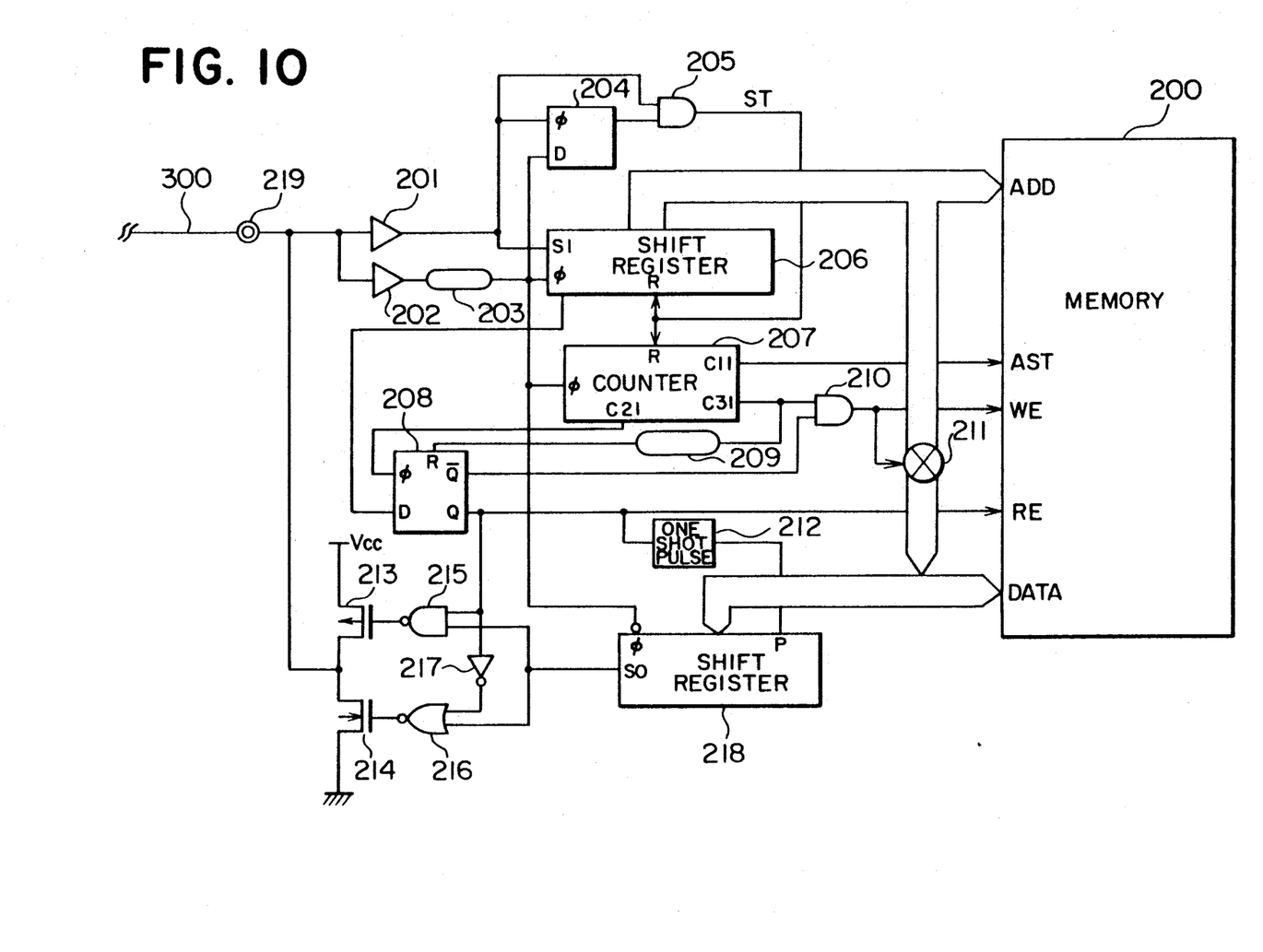
FIG. 10 is a block diagram of a slave station in the fourth example.

Referring to FIG. 10, the slave station comprise a semiconductor memory 200, a transmission terminal 219, first and second threshold circuits 201 and 202, first and second delay circuits 203 and 209, first and second shift register 206 and 218, first and second D type flip-flop 204 and 208, a clock counter 207, first and second AND gates 205 and 210, a NAND gate 215, a NOR gate 216, an inverter 217, a transfer gate 211 and a one-shot pulse generating circuit 212 a P-channel MOS transistor 213 and a N-channel MOS transistor 214.

Then, operation of the master station and the slave station is explained.

Figure 11:
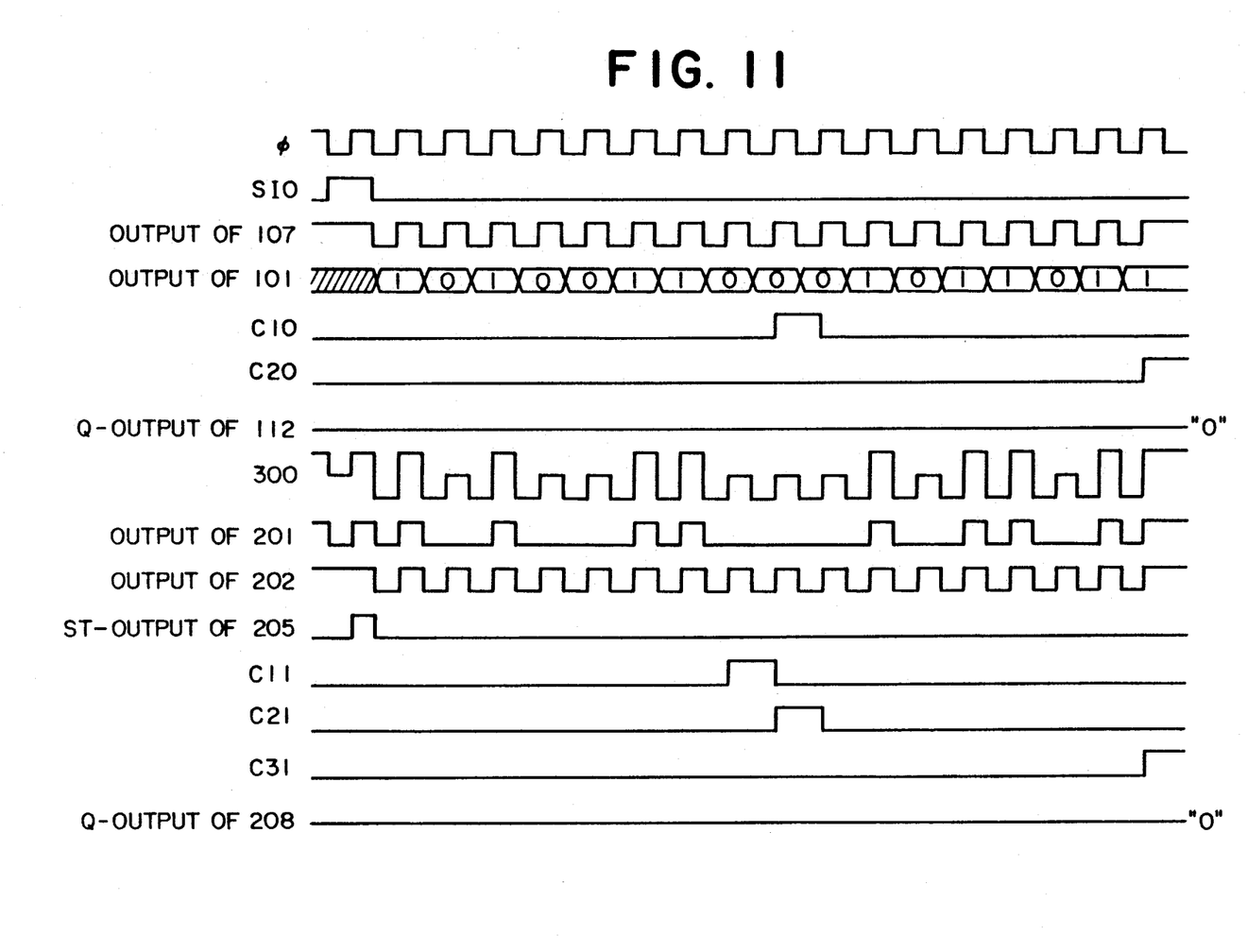
FIG. 11 is a timing chart when data is written from the master station to a memory 200 of the slave station.

First, writing data from the master station to the memory 200 of the slave station is explained with reference to FIG. 11.

It is supposed that address to be accessed is "10100110" and data signal to be written is "01011011". Further it is supposed that read/write information is "0". Address to be accessed, read/write information and data signal which are 17 bits in total are set on the first shift register 101 by the data processor 100. Thereafter, the data processor 100 generates serial data transmission command signal SIO, synchlonizing with fall of clock pulse $\phi$, during a period of 1 clock thereof, while the data processor generates read/write signal R/W of "0". The R/W signal is latched at the second flip-flop 110. Further, by the action of the first AND gate 102, the first NAND gate 103, the first OR gate 104, the second AND gate 106, the NOR gate 114, the second NAND gate 115 and the first and second inverters 105 and 113, the transfer gate 119 is opened during the period of low level of clock $\phi$ within the term of the SIO signal so that voltage level on the transmission line 300 becomes one determined by the first and second resistors 116 and 117. It is supposed that this voltage level is $V_1$. On the other hand, in the slave station, transmission start signal ST is generated by the first D type flip-flop 204 and the first AND gate 205, since threshold of the threshold circuit 201 is set between $V_{cc}$ and $V_1$, and threshold of the threshold circuit 202 is set between $V_1$ and GND (ground potential). Said signal ST resets the first shift register 206 and the clock counter 207.

Going back to the FIG. 9, the SR type flip-flop 109 is reset by receiving the SIO signal through the first flip-flop 108 so that the clock signal $\phi$ is supplied to the first shift register 101 and the clock counter 111. The first shift register 101 outputs the above-mentioned 17 bits data signal bit by bit synchronizing with the fall of the clock pulse $\phi$ and each outputted bit data appears through the first OR gate 104 and the second AND gate 106.

As previously stated in the former example, when the clock $\phi$ is at low level the combination of the second inverter 113, the third inverter 118, the NOR gate 114, the second NAND gate 115, the transfer gate 119, the first and second resistors 116 and 117 and the P-channel MOS transistor 120 and the N-channel MOS transistor 121 changes the voltage level on the transmission line 300 to GND level, and when the block $\phi$ is at high level and data is "1", said combination changes the voltage level on the transmission line 300 to $V_1$ level. Thus waveform of signal 300 shown in FIG. 11 is obtained. When 9-clocks are supplied to the $\phi$ clock terminal of the clock counter 111, the output C10 thereof is turned to high level during the period of 1 clock. By the action of the fourth inverter 130 and the third AND gates 131, the third D type flip-flop 112 fetches the output of the second D type flip-flop 110, that is read/write designating information, synchronizing with rise of the clock pulse $\phi$ during the term of the output C10. In this example, since R/W=0, that is data writing action, the output Q of the third D type flip-flop 112 remains to be "0."

On the other hand, in the slave station (FIG. 10), the output of the threshold circuit 202 is inputted to the $\phi$ clock terminal of the first shift register 206 through the delay circuit 203, and the output of the threshold circuit 202 is supplied to the ST-data shift input terminal of the first shift register 206. Therefore the information "10100110" is fetched in order thereof bit by bit to the first shift register 206. When 8 clocks are inputted to the $\phi$ clock terminal of the clock counter 207, output C11 thereof is turned to high level. The output C11 is supplied to the AST-address latch terminal of the memory 200. Therefore, the 8 bits information "10100110" obtained from the first shift register 206 is supplied to the memory and fetched at the memory as address information. When the 9 bits information, that is the read/write designating information is fetched to the forward bit register section of the first shift register 206, the output C21 of the clock counter 207 is turned to high level Thus, the read/write designating information is fetched to the second D type flip-flop 208. In this example, since the read/write designating information is "0", the output Q of the second D type flip-flop 208 remains to be "0" Therefore, a NAND gate 215 and a NOR gate 216 remain to be closed, so the common output point of the P-channel MOS transistor 213 and the N-channel MOS transistor 214 remains to be in the high inpedance-state.

Again going back to the FIG. 9, after the master station has transmitted address to be accessed and read/write designating information to the slave station, the master station continuously transmitts the 8 bits data signal "01011011" to be written to the slave station, said data signal being fetched to the first shift register 206 of the slave station. The read/write designating information which has been fetched is shifted-out from the first shift register 206. When 17 clocks are inputted to the $\phi$ clock terminal of the clock counter 207, that is, when all bits to be written are provided to the first shift register 206, the output C31 of the first shift register 206 is turned to high level. Since the output $\overline{Q}$ of the second D type flip-flop 208 is "1", the output of the second AND gate 210 is turned to "1". The output "1" opens the transfer gate 211 so that the 8 bits data signal from the shift register 206 is supplied to the DATA-input and output terminal of the memory 200, while the write enable signal of "1" is given to the write enable terminal of the memory 200. Thus, in the memory 200, data is written into the address which has been accessed according to the above address information. On the other hand, in the master station, since the C20-output of the clock counter 111 is turned to high level by 17 bits, the SR type flip-flop 109 is set, the second OR gate 107 is closed so that the supply of clock pulse to the first shift register 101 is stopped. Thereby the data transmission from the master station to the slave station ends.

Figure 12:
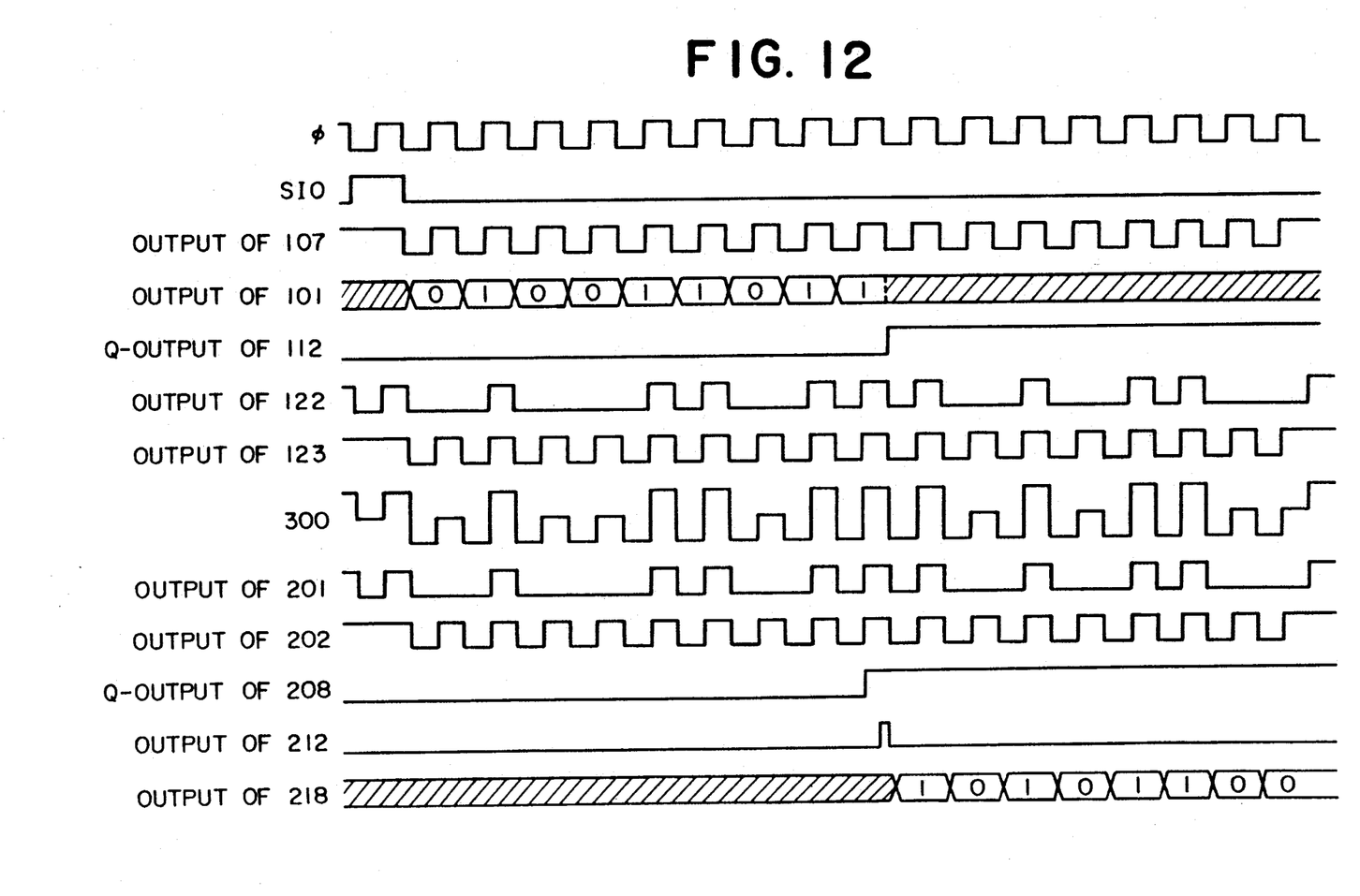
FIG. 12 is a timing chart when data from the address of the slave station is accepted by the master station.

Then, the case where address is sent from the master station to the slave and data from said address is accepted to the master station is explained with reference to FIG. 12.

The data processor 100 of the master station writes address of 8 bits "01001101" and read/write designating information "1" on the first shift register 101, while the data processor 100 generates the serial transmission command signal SIO. At the same time, a R/W signal of "1" is generated. The shift clock counter 111 and flip-flop 112 are reset by a SIO signal. Further, as above-mentioned, in the slave station (FIG. 10), a start signal ST is generated by which the first shift register 206 and the clock counter 207 are reset. When a 8 bits address from the master station is fetched to the shift register 206, the clock counter 207 outputs "1" at C11 so that the above address is latched to the memory 200. When the 9 bit read/write information is transmitted from the master station, the output of the second D type flip-flop 110 is fetched to the third D type flip-flop 112 so that the output Q of the third D type flip-flop 112 is turned to "1". Consequently, the first OR gate 104 is closed, thereafter the output from the first shift register 101 is nullified. The output of the second AND gate 106 is fixed to "1", and the transfer gate 119 is kept at on-state. Therefore, thereafter, the P-channel MOS transistor 120 and the N-channel MOS transistor 121 are alternately turned to on and off synchronizing with the clock $\phi$. As output $\overline{Q}$ of the third D type flip-flop is "0", the third and fourth OR gates 124 and 125 are opened.

On the other hand, in the slave station (FIG. 10), the read/write information is fetched to the first shift register 206, by which the output C21 of the clock counter 207 is turned to "1" and the output Q of the second D type flip-flop 208 is turned to "1". This output Q of "1" is supplied to a RE-read enable terminal of the memory so that the memory 200 becomes output state. Since the address to be accessed has been provided, the supply of "1" to the RE-terminal causes data from the address appearing at the DATA-terminal of the memory 200, after a few delay from the supply of "1" to the RE-terminal. The one-shot pulse generating circuit 212 synchronizes with a change of the output Q of the flip-flop 208 into "1", which generates a one-shot pulse, after a given delay. Said pulse is supplied to a P-preset terminal of the second shift register 218, by which the output data from the memory 200 is written to the second shift register 218. Further, the NAND gate 215 and the NOR gate 216 is opened by the output Q of the second D type flip-flop 207.

The master station changes the level on the transmission line 300 into low level, since the change of clock $\phi$ into low level renders the N-channel MOS transistor 121 conductive. This change of level is detected by the threshold circuit 202 of the slave station and is supplied as a shift clock to the second shift register 218. Supposing data set from the memory 200 on the second shift register 217 is "10101100", "1" appears at the output of the shift register 218, which renders the P-channel MOS transistor 213 conductive. The transistor 213 makes the level on the transmission line 300 heighten to $V_{cc}$ level. However, since its current capability is set smaller than that of the N-channel MOS transistor 121 of the master station, the transmission line 300 is substantially kept at GND level.

When the clock signal $\phi$ is changed from low to high, the N-channel MOS transistor 121 is rendered non-conductive, the P-channel MOS transistor 120 is rendered conductive, and the P-channel MOS transistor 213 of the slave station is conducting, so that the level on the transmission line 300 becomes $V_{cc}$ level. Therefore the outputs of both the threshold circuit 122 and the threshold circuit 123 are "1" so that data signal "1" is fetched $\phi$ to the second shift register 128. When the clock signal $\phi$ is again turned to "0", the N-channel MOS transistor 121 is rendered conductive, the P-channel MOS transistor 120 is rendered non-conductive, and the level on the transmission line 300 becomes GND level. Therefore, "0" is outputted from the second shift register 218, by which the P-channel MOS transistor 213 is rendered non-conductive and the N-channel MOS transistor 214 is rendered conductive. When the clock signal $\phi$ is changed to high level, the P-channel MOS transistor 120 is rendered conductive and the N-channel MOS transistor 121 is rendered non-conductive. Herein, the ratio of the current capability of the P-channel MOS transistor 120 to that of the N-channel MOS transistor 214 is set to equal to the ratio of the resistance of the resistor 116 to that of the resistor 117. Therefore when data "0" is outputted from the second shift register 218, the level on the transmission line 300 becomes substantially $V_1$ level during the term when the clock signal $\phi$ is at high level. Therefore the threshold of the threshold circuit 122 is set to be between $V_{cc}$ and $V_1$, and threshold of the threshold circuit 125 is set to be between $V_1$ and GND. Consequently data "0" is fetched to the shift register 128 of the master station. Hereinafter in the same manner, the remaining data "101100" is outputted from the slave station in order and fetched to the shift register 128 of the master station.

When the 8 bits data is provided at the second shift register 128, a output C20 of the clock counter 111 is turned to "1", and a request is received data from the shift register 128 is produced for the data processor 100, while the SR type flip-flop 109 is rendered the set condition. On the other hand, when all the 8 bits data signal is outputted from the shift register 218, "1" is outputted at C31-output of the clock counter 207. Since the output Q of the second D type flip-flop 208 is "0", the output of the AND gate 210 is kept at "0" so that the memory 200 is not rendered a data-write condition. The output C31 of "1" is delayed by time being equivalent to about half a clock of the clock signal $\phi$, by the delay circuit 209, by which the flip-flop 208 is rendered reset-condition. Therefore the output Q is turned to "0", the NAND gate 215 and the NOR gate 216 are closed, so the common output point of the P-channel MOS transistor 213 and the N-channel MOS transistor 214 becomes high-impedance condition and the level on the transmission line 300 is turned to $V_{cc}$ level and kept thereat. Thus data read-out from the slave station ends.

What is claimed is:

1. A combination comprising a data transmission unit, a data receiving unit, and a single transmission line connected between said data transmission unit and said data receiving unit, said data transmission unit comprising:

means for generating cyclically recurring clock signals for defining a plurality of timing intervals;

means for synchronizing data to be transmitted with clock signals, said clock signal comprising a series of alternately low and high voltage levels;

means for transmitting said data to a data receiving unit via a single transmission line;

first means responsive to data signals for outputting a first voltage level to said single transmission line during one-half of each of a plurality of timing intervals;

second means responsive to data signals for outputting a second voltage level to said single transmission line during half of each timing interval when said data to be transmitted are on a first logical level; and third means responsive to data signals for outputting an intermediate voltage level which is between said first and second voltage levels to said single transmission line during half of each timing interval when said data to be transmitted are on a second logical level; said data receiving unit responding to data transmitted over said single line, comprising:

fourth means for producing a timing signal when a voltage level on said single transmission line is changed from said first voltage level to either said second voltage level or said intermediate voltage level;

fifth means for outputting said first logical level when a signal level on said signal transmission line is changed when the first voltage level is changed from first to second voltage level and outputting said second logical level when said voltage level on said signal transmission line is changed to the intermediate voltage level; and 'sixth means for discriminating the logical level which is output by the fifth means in response to said timing signal from the fourth means in order to reproduce said data which is to be transmitted.

2. The combined data transmission and receiving units of claim 1 further comprises a shift register, and wherein said fifth means is a comparator means for comparing the voltage level of received signals having high, low, and intermediate potential levels, means responsive to said comparator for inserting either a "1" or a "0" signal into said shift level depending upon which of two of the potential levels are received, and delay means for coordinating the timing at which said signals are inserted into said shift register.

3. A combination comprising a data transmission unit, a data receiving unit, a source of clock pulses, and a transmission line coupled between said data transmission unit and said data receiving unit to transmit signals at three different voltage levels, said data transmission unit comprising:

first means for outputting a third of said voltage levels to said transmission line during one-half of said clock pulses from said source for transmitting transfer start information and for outputting a first of said voltage levels to said transmission line during the remaining half of said clock pulses;

second means for outputting a second of said voltage levels to said transmission line during one-half of each of the clock pulses for transmitting said data;

third means for outputting said first voltage level to said transmission line during the remaining half of each of the clock pulses for transmitting said data when said data to be transmitted are on a first logical level; and fourth means for outputting said third voltage level to said transmission line during the remaining half of each of the clock pulses for transmitting said data when said data to be transmitted are on a second logical level;

said data receiving unit comprising:

fifth means having a fourth voltage level as a threshold value which is between said first and said third voltage levels for outputting said first logical level when the voltage level of said transmission line is closer to the side of said first voltage level than it is to said fourth voltage level, and for outputting said second logical level when the voltage level of said transmission line is on the side opposite to said first voltage level;

sixth means having a fifth voltage level which is a threshold value between said second and said third voltage levels and for outputting said second logical level when the voltage level of said transmission line is closer to the side of said second voltage level than it is to said fifth voltage level and for outputting said first logical level when the voltage level of said transmission line is on the side opposite to said second voltage level;

seventh means for responding to outputs from said fifth and sixth means which a reproduced by said data transmission unit while transmitting said transfer start information to said transmission line, to thereby detect said transfer start information; and means for responding to the outputs from said fifth and sixth means, which are produced by said data transmission unit while transmitting said transfer start information to said transmission line and said transfer start information detected from said seventh means, to thereby reproduce the data to be transmitted.

4. A data transmission unit for synchronizing data to be transmitted with clock signals and for transmitting said data to a data receiving unit via a signal line, said unit comprising:

producing means for producing a first voltage level at a first output terminal connected to said signal line, a second voltage level at a second terminal, a third voltage level at an output node, said third voltage level being between said first and second voltage levels; 'first switch means connected between said first terminal and said first output terminal;

second switch means connected between said second terminal and said first output terminal;

third switch means connected between the output node of said producing means and said first output terminal;

means for switching off both said first and third switch means and switching on said second switch means during one-half of each of said clock signals;

means for switching off both said second and third switch means and switching on said first switch means during the remaining one-half of said signal when said data to be transmitted are on a first logical level; and means for switching off both said first and second switch means and switching on said third switch means during the remaining one-half of said clock signal when said data to be transmitted are on a second logical level.

5. A data transmission unit for synchronizing data to be transmitted with clock signals and for transmitting said data to a data receiving unit via a single transmission line, said transmission unit comprising:

means for generating clock cylindrical recurring signals comprising a series of alternately low and high voltage levels;

first means for outputting a first voltage level to a single transmission line during one-half of each of a plurality of timing intervals;

second means for outputting a second voltage level to said signal transmission line during half of each timing interval when said data which are to be transmitted are on a first logical level;

third means for outputting an intermediate voltage level which is between said first and second voltage levels to said single transmission line during half of each timing interval when said data to be transmitted are on a second logical level;

a shift register means driven responsive to said clock signals, a plurality of logic gate means coupled to an output of said shift register means, a pair of transistors coupled in series between a high potential source and a low potential source, an output terminal coupled to a junction between said two series connected transistors, said first means comprising individually associated ones of said logic gate means responsive to one phase of said clock signals for switching on one of said transistors coupled between said low potential source and said output terminal, whereby said low potential is applied to said output terminal;

said second means comprising other individually associated ones of said logic gate means responsive to another phase of said clock signals for switching on the other of said transistors coupled between said high potential and said output terminal, whereby said high potential is applied to said output terminals; and a voltage divider connected between said high potential source and said low potential source, electronic switch means coupled between an output of said voltage divider and said output terminal, and said third means comprising still other individually associated ones of said logic gate means responsive to another phase of said clock pulses for applying a voltage taken from said output of voltage divider to said output terminal.

6. A combination comprising a data transmission unit, a data receiving unit, and a single transmission line connected between said data transmission unit and said data receiving unit, said data transmission unit comprising:

means for generating cyclically recurring clock pulses;

means for synchronizing data to be transmitted with clock signals, said clock signal comprising a series of alternately low and high voltage levels;

means for transmitting said data to a data receiving unit via a single transmission line;

first means responsive to data signals for outputting a first voltage level to said single transmission line during one-half of each of a plurality of timing intervals;

second means responsive to data signals for outputting a second voltage level to said single transmission line during half of each of the timing intervals when said data to be transmitted are on a first logical level;

third means responsive to data signals for outputting an intermediate voltage level which is between said first and second voltage levels to said single transmission line during half of the corresponding timing interval when said data to be transmitted are on a second logical level;

said data receiving unit comprising:

fourth means for producing a timing signal when a voltage level on said single transmission line is changed from said first voltage level to either said second voltage level or said intermediate voltage level;

fifth means for outputting said first logical level when a signal level on said single transmission line is changed from the first voltage level to the second voltage level and for outputting said second logical level when said single transmission line is changed to the intermediate voltage level;

sixth means for discriminating between the logical levels which are output by the fifth means in response to said timing signal from the fourth means in order to reproduce said data which is to be transmitted;

a shift register means driven responsive to said clock signals, a plurality of logic gate means coupled to an output of said shift register means, a pair of transistors coupled in series between a high potential source and a low potential source, an output terminal coupled to a junction between said two series connected transistors, said first means comprising individually associated ones of said logic gate means responsive to one phase of said clock signals for switching on one of said transistors coupled between said low potential source and said output terminal, whereby said low potential is applied to said output terminal;

said second means comprising other individually associated ones of said logic gate means responsive to another phase of said clock signals for switching on the other of said transistors coupled between said high potential and said output terminal, whereby said high potential is applied to said output terminal;

a voltage divider connected between said high potential source and said low potential source, electronic switch means coupled between an output of said voltage divider and said output terminal; and said third means comprising still other individually associated ones of said logic gate means responsive to another phase of said clock pulses for applying a voltage taken from said the output of voltage divider to said output terminal.

* * * * *